United States Patent Office 2,933,509
Patented Apr. 19, 1960

2,933,509

STEROID DELTA 1,4,6-STEROID TRIENE-3-ONES AND PROCESSES OF PREPARING THEM

John M. Chemerda, Metuchen, and Arthur E. Erickson, Cranford, N.J., assignors to Merck & Co., Inc., Rahway, N.J., a corporation of New Jersey No Drawing. Application January 21, 1958
Serial No. 710,187

5 Claims. (Cl. 260—397.2)

This invention is concerned generally with novel steroid ketones and with processes of preparing them. More particularly, it relates to steroids of the ergosterol and pregnane series having in rings A and B a $\Delta^{1,4,6}$-triene-3-one function, and with processes for preparing these compounds starting with the corresponding steroid $\Delta^4$-ene-3-ones. This novel synthesis leads for example, to the new steroid compounds, 1,4,6,22-ergostatetraene-3-one and 1,4,6-pregnatriene-3,11,20-trione-17,21-diol. The former compound is useful as an intermediate in the synthesis of estrone and 19-nor hormonal products. The latter compound and its 21-esters possess extremely high cortisone-like activity but do not possess sodium or water retention action. Accordingly, these new compounds are especially effective in the treatment of arthritis and related diseases since they can be administered for their anti-inflammatory action without producing undesired metabolic effects such as edema. The present application is a continuation-in-part of our prior application Serial No. 690,428 filed October 16, 1957, now abandoned.

In accordance with this invention, a steroid-4-ene-3-one is reacted with an acylating agent to form the corresponding enol acylate, the 3-acyloxy-steroid-3,5-diene; this enol acylate is reacted with N-bromo-succinimide to form a 6-bromo-steroid-4-ene-3-one which is then reacted with collidine to give a steroid-4,6-diene-3-one compound. The latter compound is reacted with p-toluene sulfonic acid and isopropenyl acetate to form a 3-acyloxy-steroid-2,4,6-triene which, upon reaction with N-bromosuccinimide, is converted to the corresponding 2-bromo-steroid-4,6-diene-3-one; the latter compound is then reacted with collidine to give the desired steroid-1,4,6-triene-3-one compound.

The following examples illustrate methods of carrying out the present invention but it is to be understood that these examples are given for purposes of illustration and not of limitation.

*Example 1*

A mixture of 12 gms. isoergosterone (4,6,22-ergostatriene-3-one) and 1.2 gms. p-toluenesulfonic acid in 480 cc. benzene is heated until 240 cc. benzene distills off. Isopropenyl acetate (120 cc.) is added and the mixture is heated at reflux temperature four hours under nitrogen and protected from light. After cooling, 720 mgms. anhydrous sodium acetate is added and the mixture concentrated under reduced pressure at 40° C. The residue is dissolved in 200 cc. benzene and the benzene solution is washed with cold 5% aqueous sodium bicarbonate solution, water, dried over $Na_2SO_4$ and concentrated. The crude enol acetate is purified by chromatography on acid washed alumina using a mixture of ether-benzin for development to give substantially pure 3-acetoxy-2,4,6,22-ergostatetraene; M.P. 142–4° C.

*Example 2*

A solution of 3.04 gms. of N-bromosuccinimide in 60 cc. dimethyl formamide is added to 7.4 gms. of the enol acetate prepared in Example 1 dissolved in 60 cc. benzene. To the clear solution 1.6 gms. of water is added and the mixture stirred five minutes (until negative starch iodide test). The reaction solution is added to 500 cc. ice water and extracted with benzene. The benzene extract is washed with water, dried, and concentrated in vacuo to give crude 2-bromo-4,6,22-ergostatrien-3-one.

*Example 3*

The crude bromoketone prepared in Example 2 is dissolved in 50 cc. collidine and heated at reflux temperature under nitrogen one hour. After cooling, the reaction solution is diluted with 300 cc. ether, washed with cold one normal hydrochloric acid, water, and then dried. The residue obtained upon evaporation of the dried solution is purified by chromatography on alumina using ether-benzin for development to give substantially pure crystalline 1-dehydroisoergosterone (1,4,6,22-ergostatriene-3-one); M.P. 111–112° C.

*Example 4*

200 mgm. of p-toluene sulfonic acid is suspended in 80 cc. benzene and heated until 40 cc. distills off. Isopropenyl acetate (20 cc.) and 2 gms. of cortisone acetate are added and the mixture is heated at reflux temperature under nitrogen and protected from light during four hours. After cooling, 120 mgms. anhydrous sodium acetate is added and the mixture is concentrated under reduced pressure at 35–40° C. The residue is triturated with 10 cc. dry benzene, the benzene is evaporated and the residue recrystallized from benzene to give 3,5-pregnadiene-3,17α,21-triol-11,20-dione 3,17,21-triacetate; M.P. 148–151° C.

*Example 5*

The crude enol acetate prepared in Example 4 is dissolved in 20 cc. benzene and a solution of 895 mgms. of N-bromosuccinimide in 20 cc. dimethyl formamide and 450 mgms. of water is added. After stirring for ninety minutes at room temperature, the residual N-bromosuccinimide is discharged by addition of a few drops of allyl alcohol. The reaction mixture is added to 200 cc. ice water and extracted with benzene. The benzene extract is washed with water, dried, and concentrated in vacuo. This crude bromination product is crystallized from acetone to give substantially pure 6-bromo-4-pregnene-17α, 21-diol-3,11,20-trione 17,21-diacetate; M.P. 165–166.5° C.

*Example 6*

The 6 bromo derivative prepared in Example 5 is dissolved in 5 cc. collidine and 12.5 cc. dimethyl formamide. The solution is heated at reflux temperature under nitrogen for two hours. After cooling, the solution is added to 150 cc. ice water containing 3.2 cc. concentrated aqueous hydrochloric acid. The solid is filtered and washed with water until free of acid. The wet filter cake is dissolved in 50 cc. chloroform, dried over $Na_2SO_4$, decolorized with activated charcoal, and concentrated. One recrystallization from ethanol gives 6-dehydrocortisone 17,21-diacetate; M.P. 220–1° C.

*Example 7*

3.5 gms. of p-toluenesulfonic acid is suspended in 500 cc. benzene and heated until 250 cc. distills off. Isopropenyl acetate (600 cc.) and 15 gms. of 6-dehydrocortisone-17,21-diacetate are added, and the mixture is heated at reflux temperature under nitrogen and protected from light for three hours. After cooling, 5.3 cc. triethylamine is added and the mixture concentrated under reduced pressure. The residue is dissolved in 50 cc. dry benzene and reconcentrated to give the crude enol acetate, 2,4,6-pregnatriene-3,17α,21-triol-11,20-dione 3,17,21-triacetate.

Example 8

The crude enol acetate prepared in Example 7 is dissolved in 150 cc. benzene and a solution of 6.05 gms. of N-bromosuccinimide in 150 cc. dimethyl formamide and 3.06 gms. of water added. After stirring about one hour at room temperature, reaction is complete (negative starch iodide test). The reaction mixture is added to 1500 cc. ice water and extracted with benzene. The benzene extract is washed with water, dried, and concentrated in vacuo. The resulting crude product is recrystallized from acetone-benzin to give substantially pure 2-bromo-4,6-pregnadiene-17α,21-diol-3,11,20-trione 17,21-diacetate; M.P. 231–2° C. (dec.).

Example 9

14.5 g. of crude 2-bromo-4,6-pregnadiene-17α,21-diol-3,11,20-trione 17,21-diacetate is added to a mixture of 40 cc. collidine and 100 cc. dimethyl formamide and heated at reflux temperature under nitrogen for two hours. After cooling, the reaction mixture is added to 200 cc. ice water and 38 cc. concentrated aqueous hydrochloric acid. The solid is filtered and washed free of acid with water. The moist filter cake is dissolved in 150 cc. chloroform, and the chloroform solution is dried and concentrated in vacuo. The residue is purified by alumina chromatography to give substantially pure 1,6-bisdehydrocortisone 17,21-diacetate (1,4,6-pregnatriene-17α,21-diol-3,11,20-trione 17,21-diacetate); M.P. 175–176° C.

100 mg. of 1,4,6-pregnatriene-17α,21-diol-3,11,20-trione 17,21-diacetate is dissolved in a mixture of 1.0 cc. of benzene and 1.00 cc. of 1.0 N methanolic potassium hydroxide, and the solution is allowed to stand at room temperature for a period of about 10 minutes. The solution is then acidified with acetic acid, the benzene is evaporated in vacuo, and the residual material is recrystallized from ethyl acetate-ether to give substantially pure 1,4,6-pregnatriene-17α,21-diol-3,11,20-trione.

Various changes and modifications may be made in carrying out the present invention without departing from the spirit and scope thereof. Insofar as these changes and modifications are within the purview of the annexed claims, they are to be considered as part of this invention.

We claim:

1. The process which comprises reacting a steroid having in rings A and B a $\Delta^{4,6}$-diene-3-one function with an acylating agent comprising isopropenyl acetate thereby forming a steroid compound having in rings A and B a $\Delta^{2,4,6}$-triene-3-acetoxy function, and reacting the latter compound with N-bromosuccinimide followed by collidine to produce the corresponding steroid compound having in rings A and B a $\Delta^{1,4,6}$-triene-3-one function.

2. The process which comprises reacting a steroid compound having a $\Delta^4$-ene-3-one function in ring A with an acylating agent comprising isopropenyl acetate to form a 3-acyloxy-steroid-3,5-diene, and reacting this enol acetate with N-bromosuccinimide followed by collidine to form the corresponding steroid compound having in rings A and B a $\Delta^{4,6}$-diene-3-one function.

3. The process which comprises reacting a steroid compound having in rings A and B a $\Delta^{4,6}$-diene-3-one function with an acylating agent comprising isopropenyl acetate to form the corresponding steroid compound having in rings A and B a 3-acetoxy-$\Delta^{2,4,6}$-triene function.

4. 1,4,6,22-ergostatetraene-3-one.

5. The process which comprises reacting 2,4,6-pregnatriene-3,17α,21-triol-11,20-dione 3,17,21-triacetate with N-bromosuccinimide to form 2-bromo-4,6-pregnadiene-17α,21-diol-3,11,20-trione 17,21-diacetate, and reacting the latter compound with a dehydrohalogenating agent to form 1,4,6-pregnatriene-17α,21-diol-3,11,20-trione 17,21-diacetate.

References Cited in the file of this patent

UNITED STATES PATENTS

| Number | Name | Date |
|---|---|---|
| 2,705,237 | Djerassi et al. | Mar. 29, 1955 |
| 2,814,631 | Gould | Nov. 26, 1957 |
| 2,816,902 | Gould et al. | Dec. 17, 1957 |
| 2,819,264 | Gould et al. | Jan. 7, 1958 |

OTHER REFERENCES

South African Patent No. 1579 of 1956, as abstracted in the Union of South Africa Patent Journal, of December 5, 1956 (pg. 18).

Chem. & Eng. News, September 16, 1957, page 66.